March 25, 1941.   F. C. BEST   2,235,976
MECHANICAL CONNECTION
Filed Aug. 3, 1938
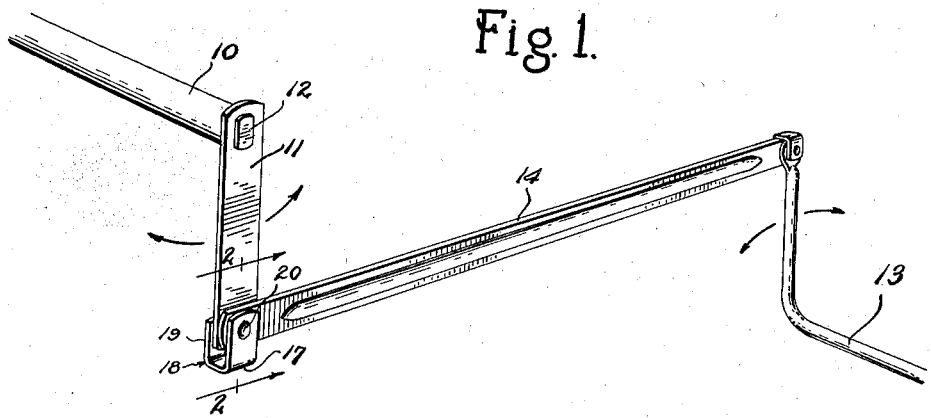
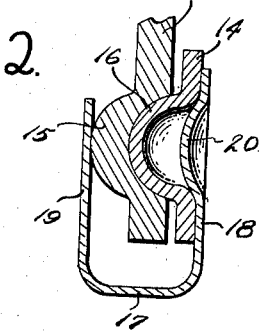
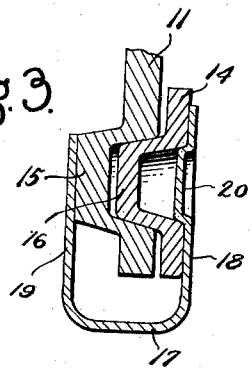
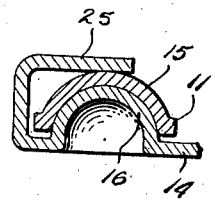
INVENTOR.
Frank C. Best
BY
ATTORNEYS Patented Mar. 25, 1941

2,235,976

UNITED STATES PATENT OFFICE 2,235,976

MECHANICAL CONNECTION

Frank C. Best, Detroit, Mich., assignor to Packard Motor Car Company, Detroit, Mich., a corporation of Michigan Application August 3, 1938, Serial No. 222,881

4 Claims. (Cl. 287—101)

This invention relates to mechanical connections and more particularly to link connections in actuating mechanisms.

It is an object of the invention to provide a mechanical connection in which a pair of links can be readily connected or disconnected.

Another object of the invention is to provide a mechanical connection that can be manufactured and assembled at low cost.

Still another object of the invention is to provide a stamped sheet metal linkage in which a pair of links are readily secured together in pivotal relation by an applied clip retainer.

A further object of the invention is to provide for the pivotal connection of a pair of links through means of a resilient connector that can be snapped into or out of retaining relation with the links.

Other objects of the invention will appear from the following description taken in connection with the drawing, which forms a part of this specification, and in which:

Fig. 1 is a perspective view of a mechanical connection incorporating the invention;

Fig. 2 is a sectional view of the actuator mechanism taken on line 2—2 of Fig. 1;

Fig. 3 is a sectional view similar to Fig. 2 showing a modified form of the invention;

Fig. 4 is a sectional view similar to Fig. 2 showing another modified form of the invention.

The invention is illustrated as forming a part of actuator mechanism for controlling a carburetor for a motor, but it will be understood that the invention can be employed equally as well for any mechanical connection in which a pair of links are retained in pivotal relationship.

In the carburetor control mechanism illustrated, 10 designates a valve carrying shaft that is fixed to one end of a lever 11. The end 12 of the shaft extends through an irregular opening in the link and has its end upset to secure it in fixed relation with the lever. An actuator lever 13 in the form of a bent rod is pivotally connected at one end to a link 14, and the lever 11 and link 14 are pivotally connected together.

This invention has to do with the connections between the elements of the actuator mechanism and provides a structure that can be readily assembled or disassembled and manufactured at low cost.

The connectilon between the lever 11 and link 14, and the connection between the links 14 and lever 13 are generally similar. As shown in the drawing, the lever 11 and link 14 are shown as sheet metal stampings, however, they can be formed in a different manner if so desired. At one end of the lever 11 there is formed a semi-spherical depressed portion 15 and at one end of the link 14 there is formed a semi-spherical depressed portion 16, such depressed portions being complementary in order that they may be nested together to provide a pivotal connection. The portion 16 of the link is of such dimensions that the remaining portion will be spaced a slight distance from the lever thus allowing for pivotal movement in a plurality of angles.

Securing the nested portions 15 and 16 together is retainer means 17. As shown in Figs. 1, 2 and 3, this retainer is a stamped U-shaped clip having spring arms 18 and 19 that can be sprung to engage over the nested portions 15 and 16. The arm 18 is formed with a depression 20 that enters the depressed portion 16 and link 14 and serves as an anchor for the retainer. The spring pressure of the resilient arms 18 and 19 against the nested portions 15 and 16 will retain the link 14 and lever 11 in pivotal relationship. The pressure exerted by the arms 18 and 19 is sufficient to securely maintain the connection and will automatically take up wear and prevent lost motion and rattles. At the same time it will allow pivotal movement without the exertion of a considerable force. The spring clip can be readily assembled or disassembled from the nested portions as its arms will give readily when pressure is exerted in pushing or pulling the base portion of the clip.

In Fig. 2 the depressed portions 15 and 16 of the link and lever are of conical form but they are complementary so that they can be associated in nested relation. In this form of the invention the clip 17 is substantially the same as shown in Fig. 2 and has the same relationship with the link and lever. With this form of the invention the link and lever are free to pivot only in one plane and for some purposes this is sufficient.

In Fig. 4 the lever 11 and link 14 are formed with semi-spherical depressions 15 and 16 in substantially the same manner as in Fig. 2, but with this form of the invention the retaining or clip means is formed as an integral part of the link. The link 14 is formed with an extended portion that is doubled back to provide a resilient arm 25 that is capable of snapping over the depressed portion 15 of lever 11 to maintain the semi-spherical depressed portions in frictional pivotal relationship. In this form of the invention the link 11 and lever 14, adjacent the nested portions, are slightly spaced so that the two links can pivot angularly in a plurality of directions the same as in the structure shown in Fig. 2.

The connection between the lever 13 and link 14 can be the same as that previously described, and in any of the various forms.

The control mechanism herein described can be made mainly from stamped members and held in pivotal relationship by retaining means formed as a separate stamping or as a part of one of the members. The connection can be readily made or broken when desired due to the resiliency of the retaining clip means. Various angular relationships can be obtained between the two connected members which in some instances is necessary, or the members can be connected so that they pivot in only one plane. The structure lends itself to low cost of initial manufacture and of assembly and disassembly while at the same time providing a connection that will sufficiently retain the links together during use. The clip connection will automatically take up wear of the members and prevent lost motion and rattle.

Although the invention has been described in connection with a specific embodiment, the principles involved are susceptible of numerous other applications which will readily occur to persons skilled in the art. The invention is therefore to be limited only as indicated by the scope of the appended claims.

What is claimed is:

1. In an actuator mechanism, a pair of members having complementary pressed-out joint forming portions at one end, said joint forming portions being nested together in pivotal relation, and a self retaining resilient member having arms adapted to be sprung over the nested end portions of the members holding them together in frictional pivotal engagement, one of said arms having a pressed-out portion nested in the pressed-out portion of one of said members.

2. In an actuator mechanism, a pair of sheet metal members having complementary semi-spherical pressed-out portions adapted to be arranged in nested relation, and a freely applied self retaining resilient clip engaging opposite faces of said nested portions of the members.

3. In an actuator mechanism, a pair of members having complementary semi-spherical portions, said portions being nested together to allow pivotal movement of the members relatively in a plurality of angular directions, and a self retaining spring clip having flexible arms sprung to engage opposite sides of the nested portions to hold said members together, said clip being freely applied to or removed from said portions when its arms are sprung.

4. In an actuator mechanism, a pair of members having complementary pressed-out portions adapted to be nested in pivotal relationship, and a U-clip having resilient arms engaging the nested portions of said members, one of the arms being formed with a pressed-out portion adapted to seat in the pressed-out portion of one of the members.

FRANK C. BEST.